(12) United States Patent
Inoue

(10) Patent No.: US 9,517,509 B2
(45) Date of Patent: Dec. 13, 2016

(54) CUTTING TOOL AND METHOD OF MANUFACTURING MACHINED PRODUCT USING THE SAME

(75) Inventor: Yoshihiro Inoue, Kyoto (JP)

(73) Assignee: Kyocera Corporation, Kyoto (JP)

(*) Notice: Subject to any disclaimer, the term of this patent is extended or adjusted under 35 U.S.C. 154(b) by 547 days.

(21) Appl. No.: 13/992,040

(22) PCT Filed: Nov. 29, 2011

(86) PCT No.: PCT/JP2011/077562
§ 371 (c)(1),
(2), (4) Date: Jun. 6, 2013

(87) PCT Pub. No.: WO2012/086375
PCT Pub. Date: Jun. 28, 2012

(65) Prior Publication Data
US 2013/0251465 A1    Sep. 26, 2013

(30) Foreign Application Priority Data
Dec. 25, 2010 (JP) .................. 2010-288982

(51) Int. Cl.
B23B 27/04 (2006.01)
B23B 27/16 (2006.01)
B23B 29/04 (2006.01)

(52) U.S. Cl.
CPC .......... B23B 27/1611 (2013.01); B23B 27/04 (2013.01); B23B 29/043 (2013.01);
(Continued)

(58) Field of Classification Search
CPC .... B23B 2205/02; B23B 27/04; B23B 29/043; B23B 27/1611; B23B 2260/132; B23C 5/2455; B23C 2200/167; B23C 2200/165; B23C 5/22
(Continued)

(56) References Cited

U.S. PATENT DOCUMENTS 1,681,675 A * 8/1928 Miller .................. B23C 5/2455
                                                                407/36
1,934,465 A * 11/1933 Hillner ................. B23C 5/2441
                                                                144/230
(Continued)

FOREIGN PATENT DOCUMENTS

EP    1671725 A1   6/2006
JP    09234609 A   9/1997
(Continued)

OTHER PUBLICATIONS

International Search Report, PCT/JP2011/077562, Dec. 20, 2011, 1 pages.

*Primary Examiner* — Sara Addisu
(74) *Attorney, Agent, or Firm* — Volpe and Koenig, P.C.

(57) ABSTRACT

In a cutting tool, at least one of an upper contact part of an upper surface of a cutting insert and an upper jaw of a holder and a lower contact part of a lower surface of the cutting insert and a lower jaw of the holder includes a first concave-convex surface and a second concave-convex surface. A distance d1 between tops of first convex parts adjacent to each other among a plurality of first convex parts of the first concave-convex surface is smaller than a distance d2 between bottoms of second concave parts adjacent to each other among a plurality of second concave parts of the second concave-convex surface in a sectional view perpendicular to the longitudinal direction of the holder.

12 Claims, 11 Drawing Sheets

(52) U.S. Cl.
CPC ..... *B23B 2200/167* (2013.01); *B23B 2205/02* (2013.01); *B23B 2205/12* (2013.01); *B23B 2220/126* (2013.01); *B23B 2260/132* (2013.01); *Y10T 82/10* (2015.01); *Y10T 407/2282* (2015.01)

(58) Field of Classification Search
USPC .................................. 407/102, 107–112, 117
See application file for complete search history.

(56) References Cited

U.S. PATENT DOCUMENTS

| | | | | |
|---|---|---|---|---|
| 1,974,215 A * | 9/1934 | Kilmer | ..................... | B23B 27/04 144/241 |
| 2,240,360 A * | 4/1941 | Whitman | .............. | B23C 5/2465 407/38 |
| 2,779,992 A * | 2/1957 | Hayes | ..................... | B23B 27/16 407/107 |
| 4,437,802 A * | 3/1984 | Hall, Jr. | ................ | B23B 27/164 407/36 |
| 5,076,738 A * | 12/1991 | Pano | ....................... | B23B 27/04 407/102 |
| 5,176,191 A * | 1/1993 | Owens | ................... | B27G 13/04 144/218 |
| 5,360,298 A * | 11/1994 | Hedlund | ............... | B23B 27/045 407/110 |
| 5,555,784 A * | 9/1996 | Muendlein | ............. | B23B 27/00 407/101 |
| 5,810,518 A * | 9/1998 | Wiman | ................. | B23B 27/065 407/102 |
| 5,836,723 A * | 11/1998 | Von Haas | ............... | B23B 27/04 407/102 |
| 5,924,826 A * | 7/1999 | Bystrom | ............. | B23B 27/1625 407/103 |
| 5,931,613 A * | 8/1999 | Larsson | .................. | B23B 27/08 407/103 |
| 6,086,291 A * | 7/2000 | Hansson | ................. | B23B 27/04 407/110 |
| 6,244,790 B1 * | 6/2001 | Kingdom | .............. | B23B 27/045 407/108 |
| 6,261,032 B1 * | 7/2001 | Duwe | ................... | B23B 27/045 407/107 |
| 6,334,742 B1 * | 1/2002 | Shiraiwa | ................. | B23B 27/04 407/107 |
| 6,921,234 B2 * | 7/2005 | Arvidsson | ............... | B23C 5/109 407/103 |
| 7,537,419 B2 * | 5/2009 | Sjoberg | ............... | B23B 27/1611 407/103 |
| 7,845,256 B2 * | 12/2010 | Pantzar | ............... | B23B 27/1611 407/113 |
| 8,992,135 B2 * | 3/2015 | Choi | ..................... | B23B 27/045 407/107 |
| 9,120,156 B2 * | 9/2015 | Hecht | .................... | B23B 27/145 |
| 2005/0158132 A1 * | 7/2005 | Pantzar | ..................... | B23C 3/30 407/48 |
| 2006/0147281 A1 | 7/2006 | Nagaya et al. | | |
| 2008/0145159 A1 * | 6/2008 | Benson | ................. | B23B 27/164 407/114 |
| 2008/0286057 A1 | 11/2008 | Nagaya et al. | | |
| 2009/0285645 A1 | 11/2009 | Hecht | | |
| 2010/0119314 A1 * | 5/2010 | Nagaya | ................... | B23B 27/04 407/113 |
| 2012/0051852 A1 * | 3/2012 | Choi | ..................... | B23C 5/2441 407/44 |

FOREIGN PATENT DOCUMENTS

| | | |
|---|---|---|
| JP | 2004223652 A | 8/2004 |
| JP | 2006167874 A | 6/2006 |
| WO | 2009141815 A1 | 11/2009 |

* cited by examiner

CUTTING TOOL AND METHOD OF MANUFACTURING MACHINED PRODUCT USING THE SAME

FIELD OF INVENTION

The present invention relates to a cutting tool and a method of manufacturing a machined product using the cutting tool.

BACKGROUND

It is being considered to reduce a sideways displacement of a cutting insert attached to a cutting tool, particularly an indexable cutting tool for a cut-off process and a grooving process. Japanese Unexamined Patent Publication No. 2004-223652 discloses a cutting tool configured to engage a cutting insert and a holder by a plurality of concave and convex parts. This configuration reduces the displacement of the cutting insert due to stress exerted in a sideways direction of the cutting insert.

However, as the number of the concave and convex parts is increased, it becomes more difficult to engage the cutting insert and the holder due to tolerance of size. Consequently, this type of cutting tool may suffer from poor reproducibility in the attachment of the cutting insert. For example, the cutting insert is fixed in a state of being more inclined than a desired state. Particularly, when performing a face grooving process for forming an annular groove on an end surface of a workpiece, the cutting speed on the right side of a cutting edge and the cutting speed on the left side thereof are different from each other due to a difference in machining diameter. Therefore, a twisting moment is exerted on the cutting edge part, and the cutting insert can easily be rotated. In this case, the cutting insert may cause the displacement during cutting.

SUMMARY

An object of the present invention is to provide an indexable cutting tool with a cutting insert less susceptible to the displacement during cutting, which is suitable for the face grooving process in addition to the cut-off process and the grooving process, and also provide a method of manufacturing a machined product using the cutting tool.

A cutting tool according to an embodiment of the present invention includes a cutting insert having an upper surface, a lower surface and a cutting edge located on at least part of sides of the upper surface, and a holder having an upper jaw and a lower jaw that respectively fix the cutting insert from the upper surface and the lower surface at a front end part in a longitudinal direction thereof. At least one of an upper contact part of the upper surface of the cutting insert and the upper jaw of the holder and a lower contact part of the lower surface of the cutting insert and the lower jaw of the holder includes a first concave-convex surface and a second concave-convex surface. The first concave-convex surface includes a plurality of first convex parts and at least one first concave part that extend along the longitudinal direction of the holder. The second concave-convex surface includes a plurality of second concave parts located correspondingly to the plurality of first convex parts and at least one second convex part located correspondingly to the at least one first concave part. A distance d1 between tops of the first convex parts adjacent to each other among the plurality of first convex parts of the first concave-convex surface is smaller than a distance d2 between bottoms of the second concave parts adjacent to each other among the plurality of second concave parts of the second concave-convex surface which are located correspondingly to the first convex parts adjacent to each other in a sectional view perpendicular to the longitudinal direction of the holder.

A method of manufacturing a machined product according to an embodiment of the present invention includes: rotating a workpiece; allowing the workpiece being rotated and the first cutting edge of the cutting tool of the foregoing embodiment to be contacted with each other; and separating the workpiece and the cutting tool from each other.

According to the cutting tool of the embodiment of the present invention, in the sectional view perpendicular to the longitudinal direction of the holder, the distance d1 between the tops of the first convex parts adjacent to each other among the plurality of first convex parts of the first concave-convex surface is smaller than the distance d2 between the bottoms of the second concave parts adjacent to each other among the plurality of second concave parts of the second concave-convex surface which are located correspondingly to the first convex parts adjacent to each other.

This leaves a gap between the first concave-convex surface and the second concave-convex surface when the cutting insert is attached to the holder, thereby facilitating elastic deformation of the contact parts. Therefore, the cutting insert can be guided to an appropriate attached state, thereby improving reproducibility of the attachment of the cutting insert. Consequently, the displacement of the cutting insert in the sideways direction can be reduced by excellent attachment stability between the concave parts and the convex parts in the contact parts.

DETAILED DESCRIPTION OF THE PREFERRED EMBODIMENTS

Cutting Tool

Cutting tools according to several embodiments of the present invention are described in details below with reference to FIGS. 1 to 12. The cutting tools of the present embodiment are usable for all of an internal grooving process, an external grooving process, the cut-off process and the face grooving process. In the following description, the cases of using the cutting tools of the embodiments of the invention for the face grooving process are illustrated and described unless otherwise noted.

First Embodiment

A first embodiment of the cutting tool according to the present invention is described below with reference to FIGS. 1 to 6.

Figure 1:
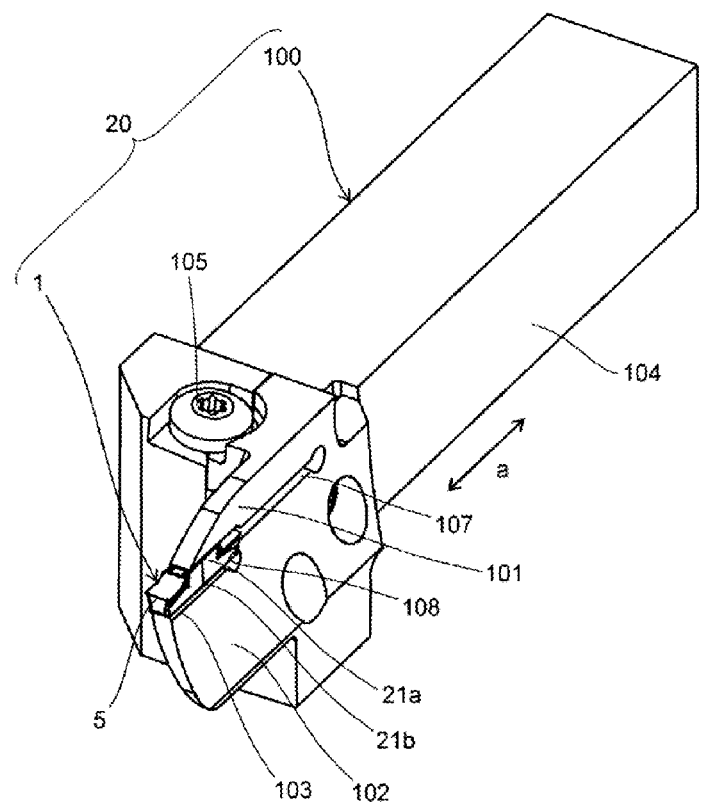
FIG. 1 is a perspective view showing a cutting tool according to a first embodiment of the present invention.
Figure 2:
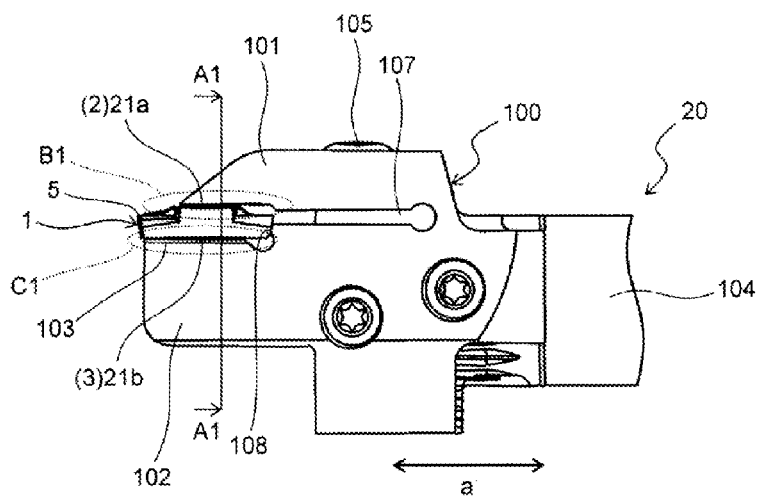
FIG. 2 is a partial side view showing a vicinity of a front end part of the cutting tool shown in FIG. 1.

As shown in FIGS. 1 and 2, the cutting tool 20 of the present embodiment has a substantially prism-like shape, and includes a cutting insert (hereinafter referred to as an "insert" in some cases) 1, and a holder 100 configured to fix the insert 1 to a front end part thereof.

Figure 6:
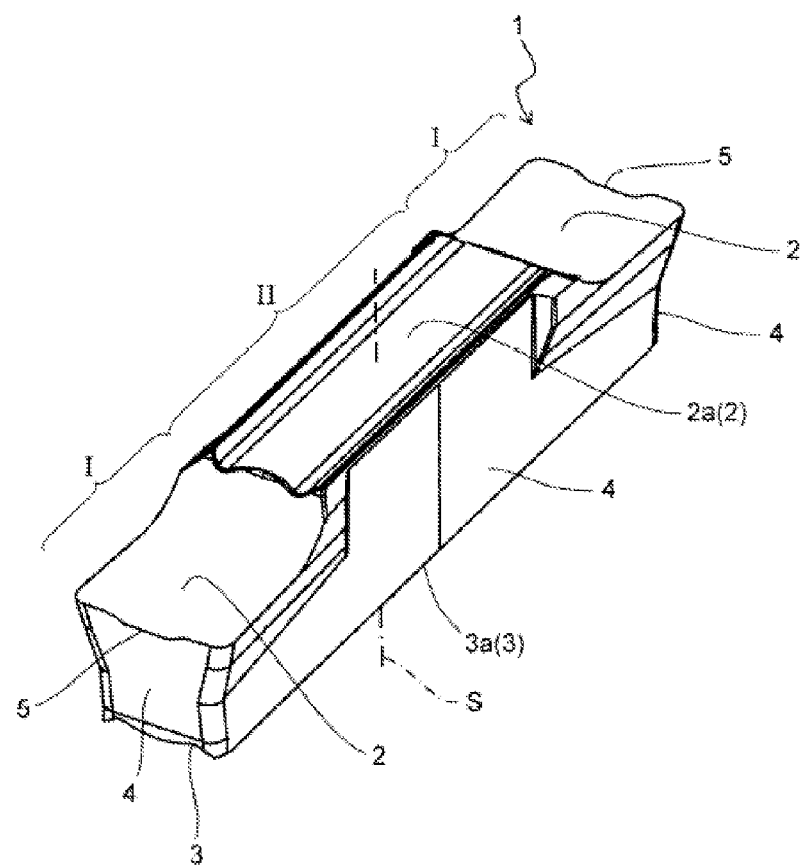
FIG. 6 is an enlarged perspective view of a cutting insert attached to the cutting tool shown in FIG. 1.
Figure 7:
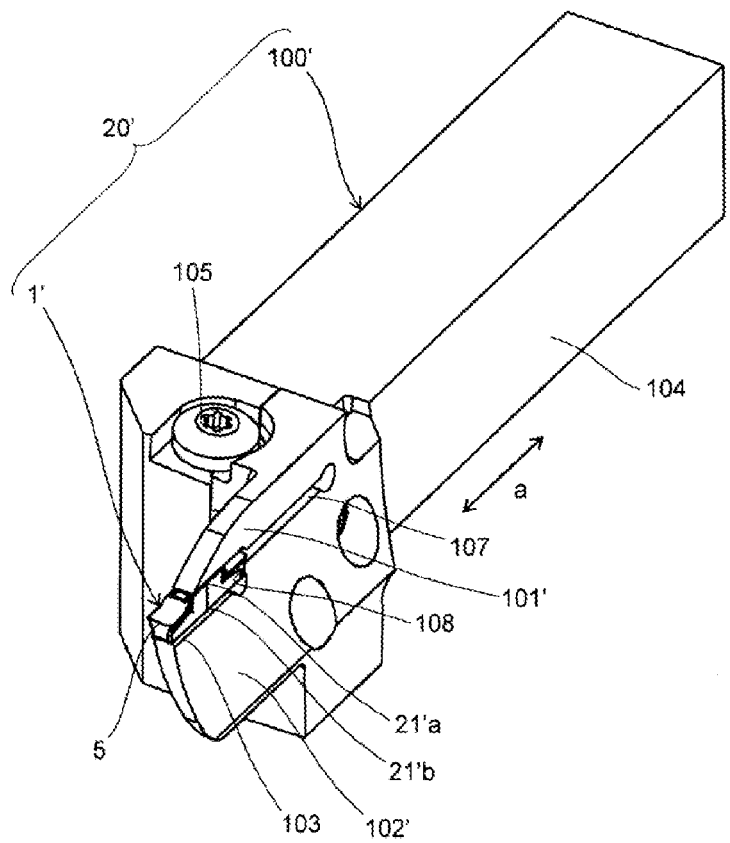
FIG. 7 is a perspective view showing a cutting tool according to a second embodiment of the present invention.
Figure 8:
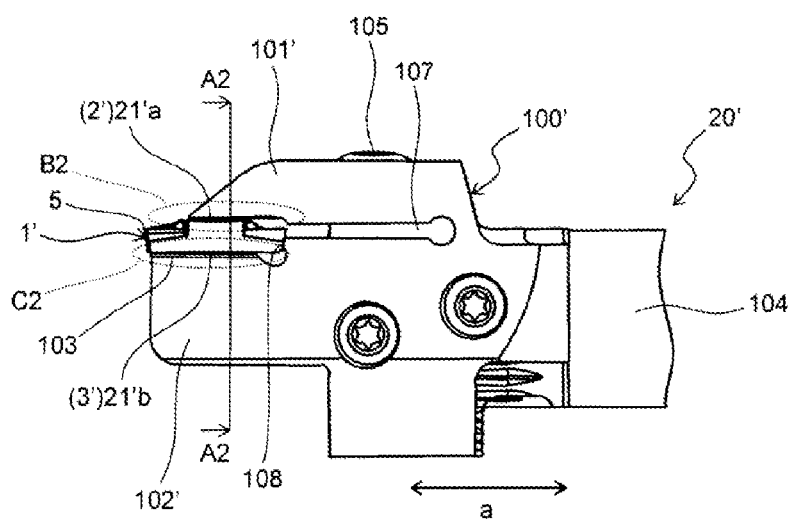
FIG. 8 is a partial side view showing a vicinity of a front end part of the cutting tool shown in FIG. 7.
Figure 9A:
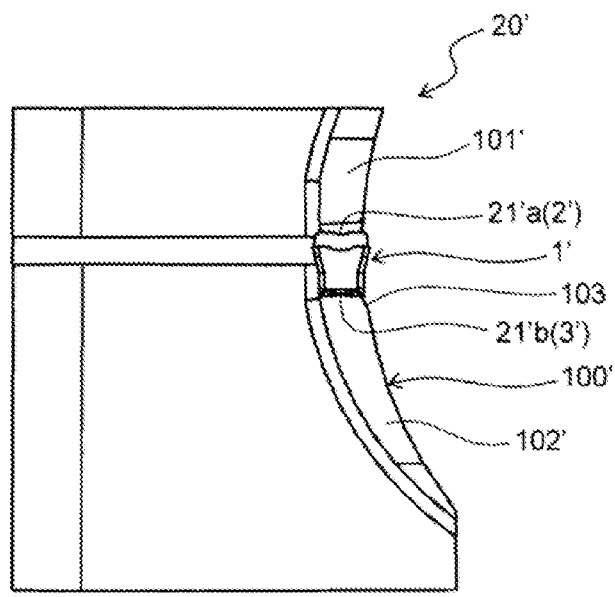
FIG. 9(a) is a front end view of the cutting tool shown in FIG. 7.
Figure 9B:
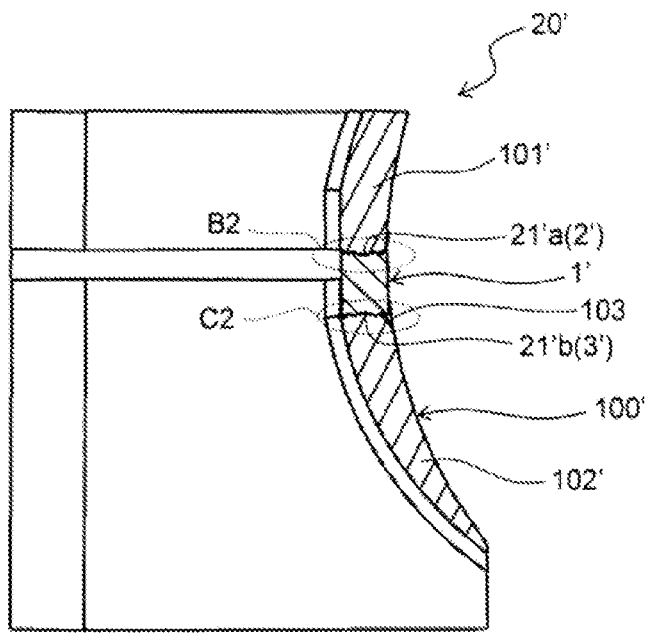
FIG. 9(b) is a sectional view taken along line A2-A2 in the cutting tool shown in FIG. 8.

The insert 1 has an upper surface 2, a lower surface 3, and a cutting edge 5 located on at least part of the sides of the upper surface 2, as shown in FIG. 6 described later. As shown in FIGS. 1 and 2, the holder 100 has an upper jaw 101 and a lower jaw 102 that respectively fix the insert 1 from the upper surface 2 and the lower surface 3. The upper and lower jaws 101 and 102 are located at a front end part of the holder 100 in a longitudinal direction thereof as shown by arrow a. The insert 1 is fixed to the holder 100 so that the cutting edge 5 protrudes from the front end part of the holder 100. The holder 100 preferably has a length of 143 to 162 mm in the longitudinal direction and a length of 29 to 42 mm in a width direction thereof.

Figure 3A:
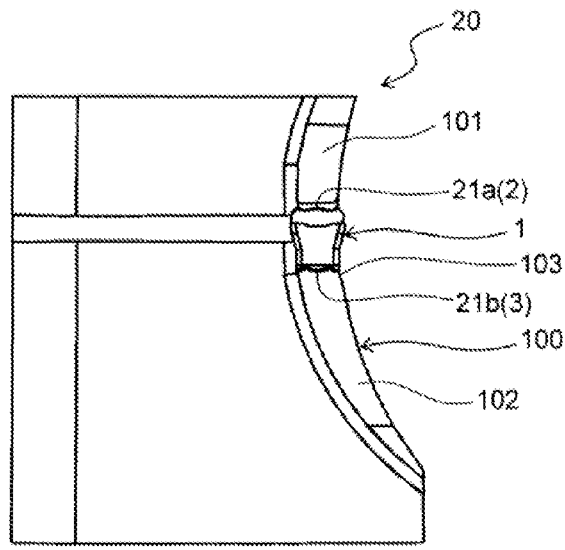
FIG. 3(a) is a front end view of the cutting tool shown in FIG. 1.
Figure 3B:
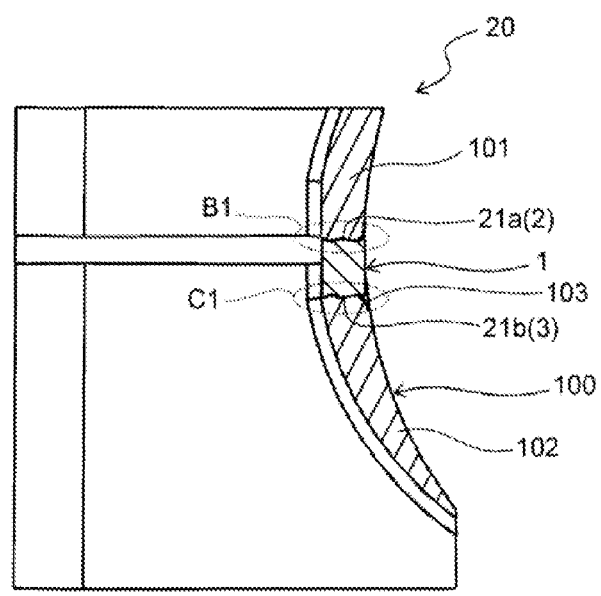
FIG. 3(b) is a sectional view taken along line A1-A1 in the cutting tool shown in FIG. 2.

As shown in FIGS. 2 and 3, the cutting tool 20 includes an upper contact part 21a comprised of the upper surface 2 of the insert 1 and a surface of the holder 100 opposed to the upper jaw 101, and a lower contact part 21b comprised of the lower surface 3 of the insert 1 and a surface of the holder 100 opposed to the lower jaw 102. The insert 1 is fixed to the holder 100 by the upper contact part 21a and the lower contact part 21b. Further, the upper contact part 21a and the lower contact part 21b are located above and below the insert 1, thereby surely fixing the insert 1 to the holder 100. As used herein, the phrase "contact part" denotes a partially contact part between surfaces opposed to each other.

Figure 4A:
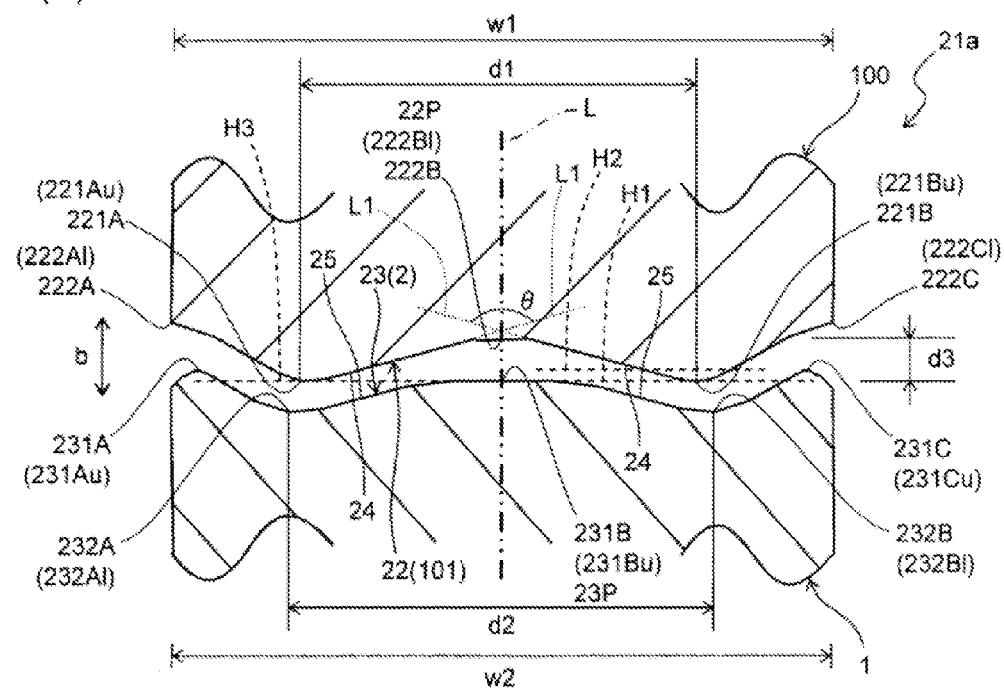
FIG. 4(a) is a partially enlarged sectional view of region B1 shown in FIG. 3(b), specifically, a drawing showing a non-pressed state.
Figure 4B:
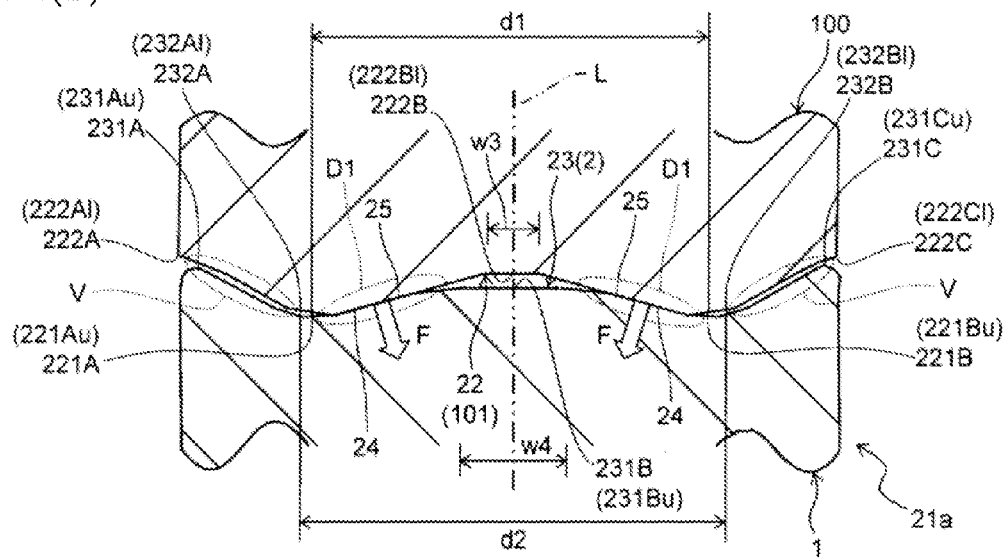
FIG. 4(b) is a drawing showing a pressed state.
Figure 5A:
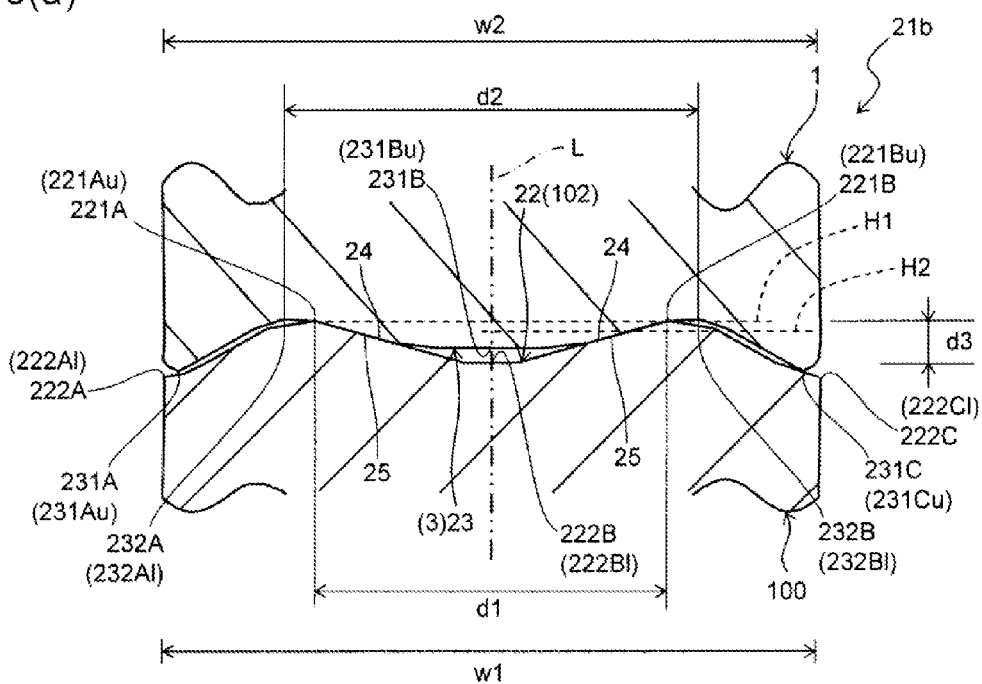
FIG. 5(a) is a partially enlarged sectional view of region C1 shown in FIG. 3(b), specifically, a drawing showing a non-pressed state.
Figure 5B:
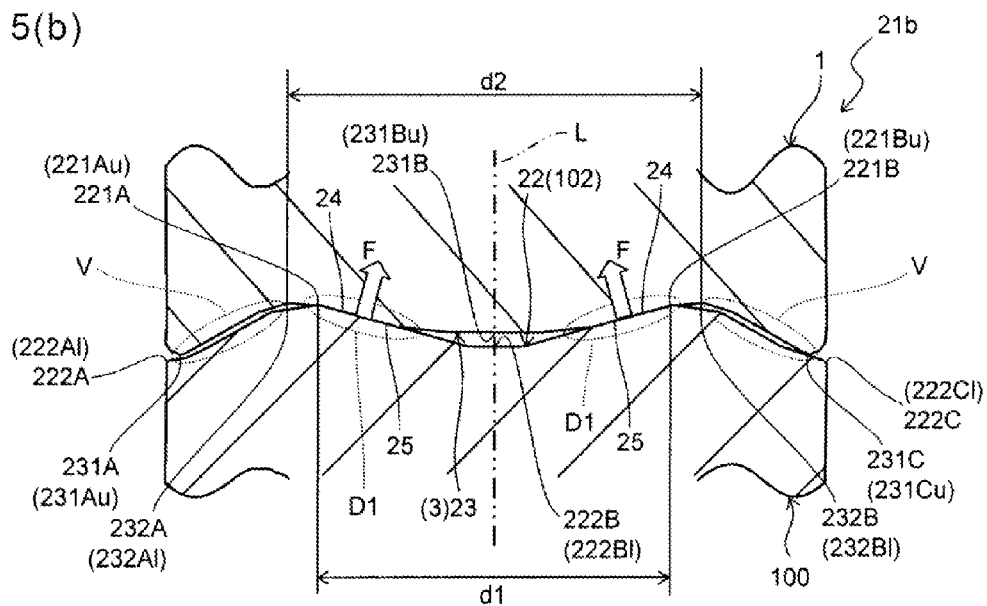
FIG. 5(b) is a drawing showing a pressed state.

As shown in FIGS. 4 and 5, at least one of the upper contact part 21a and the lower contact part 21b has a first concave-convex surface 22 and a second concave-convex surface 23. The first concave-convex surface 22 has a plurality of first convex parts 221 and at least one first concave part 222 that extend along the longitudinal direction of the holder 100. The second concave-convex surface 23 has a plurality of second concave parts 232 located correspondingly to the plurality of first convex parts 221, and at least one second convex part 231 located correspondingly to the at least one first concave part 222. This construction can reduce rotation of the insert 1 due to a moment exerted in a sideways direction thereof. For example, the length of the opposed surfaces in the longitudinal direction is preferably set at 6 to 9 mm for the upper contact part 21a and at 16 mm for the lower contact part 21b, and the length in the width direction of the opposed surfaces is preferably set at 1 to 10 mm.

Of the upper contact part 21a and the lower contact part 21b, the lower contact part 21b is more susceptible to cutting load during cutting than the upper contact part 21a. Hence, at least the lower contact part 21b preferably has the first concave-convex surface 22 and the second concave-convex surface 23. In the present embodiment, both the upper contact part 21a and the lower contact part 21b have the first concave-convex surface 22 and the second concave-convex surface 23 as shown in FIGS. 4 and 5. According to this configuration, the rotation of the insert 1 due to the moment exerted in the sideways direction thereof can be reduced by a plurality of portions of the upper contact part 21a and the lower contact part 21b. In the cutting tool of the present embodiment having the foregoing dimensions, the phrase "concave-convex surface" needs to be configured so that a difference between the top of the convex part and the bottom of the concave part in the concave part and the convex part adjacent to each other is in the range of, for example, 0.1 to 0.25 mm.

To be specific, as shown in FIG. 4(a), the upper contact part 21a includes the first concave-convex surface 22 on the upper jaw 101 of the holder 100 and the second concave-convex surface 23 on the upper surface 2 of the insert 1. The first concave-convex surface 22 has two first convex parts 221 and three first concave parts 222. The second concave-convex surface 23 has three second convex parts 231 and two second concave parts 232. For the sake of convenience, the concave parts and the convex parts in the individual concave-convex surfaces are prescribed as follows. As shown in FIG. 4(a), on the first concave-convex surface 22, the first convex parts 221 are denoted by 221A and 221B, and the first concave parts 222 are denoted by 222A, 222B and 222C in a left-to-right order of this figure. On the second concave-convex surface 23, the second convex parts 231 are denoted by 231A, 231B and 231C, and the second concave parts 232 are denoted by 232A and 232B in the left-to-right order of this figure. The first convex parts 221 and the second concave parts 232, and the first concave parts 222 and the second convex parts 231 are respectively correspondingly located. Specifically, as shown in FIG. 4(a), the parts 221A and 232A, the parts 221B and 232B, the parts 222A and 231A, the parts 222B and 231B, and the parts 222C and 231C are respectively correspondingly located. The phrase "are respectively correspondingly located" denotes, for example in FIG. 4(a), that a top 221Au of the first convex part 221A on the first concave surface 22 of the upper jaw 101 of the holder 100 is located in the range of the second concave part 232A on the second concave-convex surface 23 of the upper surface 2 of the insert 1. Specifically, the top 221Au of the first convex part 221A is located in a range from a top 231Au of the second convex part 231A to a top 231Bu of the second convex part 231B which are respectively located on both sides of the second concave part 232A.

The lower contact part 21b has the first concave-convex surface 22 on the lower jaw 102 and the second concave-convex surface 23 on the lower surface 3 as shown in FIG. 5(a). The first concave-convex surface 22 has two first convex parts 221 and three first concave parts 222. The second concave-convex surface 23 has three second convex parts 231 and two second concave parts 232. For the sake of convenience, the concave parts and the convex parts in the concave-convex surfaces are prescribed as follows. As shown in FIG. 5(a), on the first concave-convex surface 22, the first convex parts 221 are denoted by 221A and 221B, and the first concave parts 222 are denoted by 222A, 222B and 222C in the left-to-right order of this figure. On the second concave-convex surface 23, the second convex parts 231 are denoted by 231A, 231B and 231C, and the second concave parts 232 are denoted by 232A and 232B in the left-to-right order of this figure. The first convex parts 221 and the second concave parts 232, and the first concave parts 222 and the second convex parts 231 are respectively correspondingly located. Specifically, as shown in FIG. 5(a), the parts 221A and 232A, the parts 221B and 232B, the parts 222A and 231A, the parts 222B and 231B, and the parts 222C and 231C are respectively correspondingly located.

The number of the concave parts and the convex parts of the first concave-convex surface 22 and the second concave-convex surface 23 may be set suitably in consideration of cutting conditions and manufacturing errors, without being limited to those in the present embodiment. The upper contact part 21a and the lower contact part 21b may have the same shape or different shapes. In order to adjust a force to reduce the rotation of the insert 1, for example, the upper contact part 21a and the lower contact part 21b may be similar in shape. Alternatively, the upper contact part 21a and the lower contact part 21b may be different in the number of concave and convex parts and in the size thereof. By the upper contact part 21 and the lower contact part 21b having the same shape, the force to reduce the rotation of the insert 1 due to the moment exerted in the sideways direction of the insert 1 can equally be applied to the upper contact part 21 and the lower contact part 21b. In the present embodiment, the upper contact part 21a and the lower contact part 21b have the same shape, and therefore, the first concave-convex surface 22 and the second concave-convex surface 23 are described below by representatively illustrating the upper contact part 21a.

The insert 1 and the holder 100 can be constrained by bringing the first convex parts 221 and the second concave parts 232, or the first concave parts 222 and the second convex parts 231 into contact with each other. At least one set of the first convex parts 221 and the second concave parts 232, and the first concave parts 222 and the second convex parts 231 needs to be contacted with each other. In the present embodiment, the insert 1 and the holder 100 are constrained by bringing the first concave part 222B and the second convex part 231B into contact with each other, as shown in FIG. 4(b).

In the upper contact part 21a, a distance between the tops of the first convex parts 221 adjacent to each other among the plurality of first convex parts 221 of the first concave-convex surface 22 is smaller than a distance between the bottoms of the second concave parts 232 adjacent to each other among the plurality of second concave parts 232 of the second concave-convex surface 23 located correspondingly to these adjacent first convex parts 221. As shown in FIG. 4(a), the present embodiment is configured to establish a relationship of d1<d2, where d1 is a distance between tops 221Au and 221Bu in the first convex parts 221A and 221B adjacent to each other on the first concave-convex surface 22, and d2 is a distance between bottoms 232A1 and 232B1 in the second concave parts 232A and 232B adjacent to each other on the second concave-convex surface 23. This configuration leaves a gap between the first concave-convex surface 22 and the second concave-convex surface 23. That is, as shown in FIG. 4(b), in a state that the upper jaw 101 and the upper surface 2 are pressed together, the distance between the first convex parts 221 is smaller than the distance between the second concave parts 232, thus leaving a pair of gaps V between the first convex parts 221 and the second concave parts 232. Therefore, the upper contact part 21a is susceptible to elastic deformation, and the insert 1 can be guided to an appropriate attached state, thereby attaching the insert 1 at a precise position. Additionally, during the cutting, the concave parts and the convex parts can receive the force exerted in the sideways direction of the insert 1, thereby reducing the displacement of the insert 1 in the sideways direction. For example, d1 is preferably set at 1.14 to 2.32 mm, and d2 is preferably set at 1.22 to 2.40 mm. A difference between d1 and d2 is preferably set at 0.06 to 0.08 mm. Alternatively, one or more gaps may be disposed at other locations in addition to the forgoing pair of gaps V, as far as having the upper contact part 21a.

As used here, the term "gap" denotes a portion having a distance between a certain concave part and the convex part located correspondingly to the concave part. The term "top" denotes a portion of each convex part of the concave-convex surface which has a maximum amount of protrusion. The term "bottom" denotes a portion of each concave part of the concave-convex surface which has a maximum amount of recess. For example, when the portions having the maximum amount of protrusion or recess are disposed consecutively, a section where the maximum value appears consecutively may be used as the top or bottom. In this case, a distance between a certain concave part and a convex part located correspondingly to the concave part needs to be measured on the basis of a middle point of the section where the maximum value appears consecutively.

In the present embodiment, as shown in FIG. 4(a), the distance d1 is a half or more of a width w1 of the first concave-convex surface 22, and the distance d2 is a half or more of a width w2 of the second concave-convex surface 23. That is, $d1 \geq (\frac{1}{2}) \times w1$, and $d2 \geq (\frac{1}{2}) \times w2$. This configuration allows for a large contact area between the first concave part 222B and the second convex part 231B, thereby improving constraint force. More preferably, d1 is in a range of 0.55×w1 to 0.6×w1, and d2 is in a range of 0.58×w2 to 0.65×w2. For example, w1 is preferably set at 1.8 to 5.0 mm, and w2 is preferably set at 2.1 to 5.0 mm. Alternatively, w1 in the upper contact part 21a as shown in FIG. 4 and w1 in the lower contact part 21b as shown in FIG. 5 may be the same or different values. For example, when used for the face grooving process, w1 in the lower contact part 21b may be set to be smaller than w1 in the upper contact part 21a in consideration of a machining diameter.

In the present embodiment, as shown in FIG. 4(a), the concave and convex parts of the first concave-convex surface 22 and the second concave-convex surface 23 have a specific positional relationship on the basis of the reference line L. Specifically, the reference line L is a line prescribed in a sectional view of the upper contact part 21a, namely, a sectional view perpendicular to the longitudinal direction of the holder 100. In the present embodiment, the upper jaw 101 and the lower jaw 102 protrude in parallel to the longitudinal direction of the holder 100. Therefore, the reference line L is a line prescribed in a sectional view perpendicular to the longitudinal direction of the holder 100 and in a direction indicated by arrow b parallel to the central axis S of the insert 1. The phrase "central axis S of the insert 1" denotes an axis that extends between the upper surface 2 and the lower surface 3, and serves as a rotation axis when the insert 1 is rotated so that the positions of a pair of cutting sections I and I located on both ends of the insert 1 are replaced with each other.

The reference line L is also a line passing through the bottom of a first concave part 222 of the first concave-convex surface 22 and the top of the second convex part 231 on the second concave-convex surface 23 located correspondingly to the first concave part 222, which are respectively located above and below in a direction parallel to the central axis S in the foregoing sectional view. On the basis of the reference line L, the first convex part 221 located adjacent to the first concave part 222 is located closer to the reference line L than the second concave part 232 located adjacent to the second convex part 231.

To be specific, a bottom 222BI of the first concave part 222B located between the first convex parts 221A and 221B adjacent to each other and a top 231Bu of the second convex part 231B of the second concave-convex surface 23 located correspondingly to the first concave part 222B are located on the reference line L. The first convex parts 221A and 221B located adjacent to the first concave part 222B are respectively located closer to the reference line L than the second concave parts 232A and 232B located adjacent to the second convex part 231B. According to this configuration, the bottom 222BI of the first concave part 222B and the top 231Bu of the second convex part 231B are located on the reference line L, and hence the distance between the bottom 222BI of the first concave part 222B and the top 231Bu of the second convex part 231 can be reduced as much as possible by the elastic deformation. Consequently, the constraint force between the first concave part 222B and the second convex part 231B can be further enhanced. Additionally, the contact position between the first concave part 222B and the second convex part 231B can be located closer to the bottom 222BI of the first concave part 222B, and the reaction force due to the elastic deformation can be further increased, thereby further enhancing the constraint force between the first concave part 222B and the second convex part 231B.

In the present embodiment, as shown in FIG. 4, the first concave part 222B and the second convex part 231B are respectively located at a middle part of the first concave-convex surface 22 and a middle part of the second concave-convex surface 23 in the foregoing sectional view. Specifically, the reference line L coincides with perpendicular bisectors of the first concave-convex surface 22 and the second concave-convex surface 23. The reference line L also passes through a middle point 22P of the first concave-convex surface 22 and a middle point 23P of the second concave-convex surface 23 in the foregoing sectional view. According to this configuration, the portion having the strongest constraint force is located at the middle part of the first concave-convex surface 22 and the middle part of the second concave-convex surface 23, thereby constraining the insert 1 while maintaining balance in the sideways direction of the insert 1.

In the present embodiment, as shown in FIG. 4, in the foregoing sectional view, the first concave part 222B has a pair of first inclined surfaces 24 and 24 whose mutual distance decreases as going toward the bottom 222BI, and the second convex part 231B located correspondingly to the first concave part 222B has a pair of second inclined surfaces 25 and 25, which correspond to the pair of first inclined surfaces 24 and 24, and protrude toward the first inclined surfaces 24.

Further in the present embodiment, as shown in FIG. 4(b), the first inclined surfaces 24 of the first concave part 222B and the second inclined surfaces 25 of the second convex part 231B are contacted with each other. Specifically, as shown in FIG. 4(b), the first concave part 222B has the first inclined surfaces 24 and the second convex part 231B has the second inclined surfaces 25 protruding toward the first inclined surfaces 24 in regions D1, respectively. That is, the second inclined surfaces 25 are curved to come closer to the first inclined surfaces 24. According to this configuration, the first inclined surfaces 24 can easily be moved along the second inclined surfaces 25, and the contact position between the second convex part 231B and the first concave part 222B can be further closer to the bottom 222BI of the first concave part 222B. Additionally, as shown in FIG. 4(b), a compressive stress in a direction of arrow F is applied to the insert 1 by pressing, and hence the constraint force can be further enhanced. The second inclined surfaces 25A preferably have a larger radius of curvature. The radius of curvature of the second inclined surface is preferably set at, for example, 7.5 to 10 mm. The second inclined surfaces 25 of the insert 1 preferably have a convex-like shaped curved surface compared to the first inclined surfaces 24 of the holder 100 as in the case of the foregoing configuration. This achieves a further improvement in constrained stability with respect to the first inclined surfaced 24 of the holder 100.

In the present embodiment, an angle θ formed by virtual extension lines L1 and L1 of the pair of first inclined surfaces 24 and 24 is an obtuse angle in the foregoing sectional view. This configuration facilitates contact between the first inclined surfaces 24 of the first concave part 222B and the second inclined surfaces 25 of the second convex part 231B.

In the present embodiment, as shown in FIG. 4, the top 231Bu of the second convex part 231B is comprised of straight lines in the foregoing sectional view. According to this configuration, the contact position between the second convex part 231B and the first concave part 222B can be located closer to the bottom 222BI of the first concave part 222B. As shown in FIG. 4(a), from the viewpoint of improving the constraint force, the contact position between the second convex part 231B and the first concave part 222B is preferably located at the following range. Here, H1 denotes a straight line that is perpendicular to the central axis S of the insert 1 and passes through the top 221Bu of the first convex part 221B, d3 denotes a distance between the bottom 222BI of the first concave part 222B and the top 221Bu of the first convex part 221B, and H2 denotes a straight line obtained by parallel moving the straight line H1 toward the bottom 222BI of the first concave part 222B by a quarter of d3. That is, the contact position is preferably located closer to the bottom 222BI of the first concave part 222B than the straight line H2. Preferably, d3 is set at, for example, 0.12 to 0.28 mm.

In the present embodiment, the bottom 222BI of the first concave part 222B is comprised of straight lines in the foregoing sectional view. As shown in FIG. 4(b), a width w3 of the bottom 222BI of the first concave part 222B is smaller than a width w4 of the top 231Bu of the second convex part 231B. This configuration also allows the contact position between the second convex part 231B and the first concave part 222B to be further closer to the bottom 222BI of the first concave part 222B.

In the present embodiment, as shown in FIG. 4, both of the first concave convex surface 22 and the second concave-convex surface 23 have a line symmetric shape with respect to the reference line L. According to this configuration, the contact area and constraint force are uniform around the reference line L in the sideways direction of the first concave-convex surface 22 and the second concave-convex surface 23. Therefore, the insert 1 can be constrained while maintaining balance in the sideways direction of the insert 1.

In the present embodiment, as shown in FIG. 4, when the first concave-convex surface 22 is positioned on the upper side and the second concave-convex surface 23 is positioned on the lower side in the foregoing sectional view, tops 231Au and 231Cu of second convex parts 231A and 231C located farthest from the reference line L are located at a higher position than a virtual straight line H3 that passes through the top 231Bu of the second convex part 231B and is perpendicular to the central axis S of the insert 1. According to this configuration, the force exerted in the sideways direction of the insert 1 can be received by the second convex parts 231A and 231C during the cutting, thereby more effectively reducing the displacement in the sideways direction of the insert 1.

As shown in FIG. 4(b), there is no contact between the first concave parts 222A and 222C and the second convex parts 231A and 231C located correspondingly thereto. This effectively facilitates the elastic deformation.

In the present embodiment, as shown in FIG. 3(a), the lower jaw 102 is curved along the outer periphery of a machined groove in a front end view. The phrase "front end view" denotes a state that the cutting tool 20 is viewed from the front end thereof. When the lower jaw 102 is formed vertically in the front end view, an annular groove is formed by the face grooving process. Consequently, the lower jaw 102 is brought into contact with a machined groove during the process, and hence the depth of the machined groove is limited to a distance from the cutting edge 5 to the lower jaw 102. Therefore in the present embodiment, a machining diameter is determined in advance, and the lower jaw 102 is curved along the outer periphery of the machined groove.

Further in the present embodiment, as shown in FIG. 3, a chamfering part 103 is disposed at an intersection of an inner peripheral surface of the lower jaw 102 located closer to the inner periphery of the machined groove and a surface of the lower jaw 102 in the lower contact part 21b. The front end part of the insert 1 is pressed from above during the cutting, and hence the lower jaw 102 is more susceptible to a strong stress than the upper jaw 101. According to this configuration, the thickness of the lower jaw 102 can be increased to enhance the strength of the holder 100. Further, because the annular groove is machined, it becomes easier for chips to enter the internal diameter side than the external diameter side in the contact parts between the insert 1 and the holder 100. Therefore, the chips can flow toward the lower end of the lower jaw 102 by disposing the chamfering part 103.

As shown in FIGS. 1 and 2, the holder 100 of the present embodiment includes a shank 104 on a rear end side thereof with respect to the upper jaw 101 and the lower jaw 102. The holder 100 further includes a screw hole (not shown) for inserting a clamp screw 105 from the upper jaw 101 to the lower jaw 102.

In the present embodiment, the upper jaw 101 and the lower jaw 102, and the shank 104 are constructed of different members. This configuration allows for replacement of the upper jaw 101 and the lower jaw 102 and a satisfactory dealing with size variations of the insert 1. When an especially high durability is required for the entirety of the holder 100, the upper jaw 101, the lower jaw 102 and the shank 104 may be molded integrally. Owing to the integral molding of these, no connection surface is formed between the upper jaw 101 and the shank 104 and between the lower jaw 102 and the shank 104, thereby further enhancing the rigidity of the cutting tool 20.

In order to reduce the costs of the cutting tool 20 while obtaining the effect of the present embodiment, it is also effective that the rigidity of the material of the lower jaw 102 is higher than the rigidity of the materials of the upper jaw 101 and the shank 104. During the use of the cutting tool 20, the front end of the insert 1 is pressed from above, and hence the lower jaw 102 is more susceptible to a strong stress than the upper jaw 101 and the shank 104. High rigidity materials are expensive, or a high level technology is need for processing them. Therefore, the cutting tool 20 that has high durability and is inexpensive can be manufactured by using a high rigidity material for the lower jaw 102 subjected to a relatively high stress, and by using a material, which has lower rigidity and is easier to process than that of the lower jaw 102, for the upper jaw 101 and the shank 104 subjected to a relatively low stress.

Further, as shown in FIGS. 1 and 2, the holder 100 preferably includes a slit 107 on a further rear end side than the upper jaw 101 and the lower jaw 102. The slit 107 facilitates further elastic deformation of the upper jaw 101 or the lower jaw 102, thus achieving easy attachment and detachment of the insert 1 with respect to the holder 100.

The lower jaw 102 is also provided with a contact surface 108 that is used for positioning by being contacted with the side surface 4 on the rear end side of the insert 1. In this case, the slit 107 is particularly preferably formed above the contact surface 108. The thickness of the holder 100 located below the slit 107 can be increased when the slit 107 is formed above the contact surface 108 than when the slit 107 is formed below the contact surface 108.

On the other hand, as shown in FIG. 6, the insert 1 of the present embodiment has a prism-like shape, and includes a pair of cutting sections I and I located at both ends thereof, and a clamp section II which is located between the pair of cutting sections I and I, and has clamp surfaces 2a and 3a configured to be contacted with the upper jaw 101 and the lower jaw 102 when the insert 1 is fixed to the holder 100. The clamp surface 2a is located on the upper surface 2, and the clamp surface 3a is located on the lower surface 3.

The cutting sections I have a rectangular shape having two long sides and two short sides in a top view, and includes the upper surface 2, the lower surface 3 and the side surface 4 connected to each of the upper surface 2 and the lower surface 3. The phrase "top view" denotes a state that the insert 1 is viewed from the upper surface 2. The upper surface 2 functions as a rake surface, the lower surface 3 functions as a mounting surface to be mounted onto the holder 100, and the side surface 4 functions as a flank surface. For example, a length in the longitudinal direction of the insert 1 is preferably set at 20 mm, and a length in a width direction thereof perpendicular to the longitudinal direction is preferably set at 2 to 6 mm in a top view. This width decreases as going toward the clamp section II in order to prevent the insert 1 from interfering with an inner wall surface of a groove machined in a workpiece during the machining. A height of the insert 1 from the lower surface 3 to the upper surface 2 is preferably set at, for example, 4.4 to 5.0 mm according to the length in the width direction of the insert 1.

The cutting edge 5 is located on at least part of the sides of the upper surface 2 as describer earlier. The cutting edge 5 of the present embodiment is located at an intersection of the upper surface 2 and the side surface 4. For example, the cutting edge 5 is located along intersections in the longitudinal direction and width direction of the cutting sections I. The cutting edge 5 may have a straight-like line or an arc-like shape, without being limited thereto.

The clamp section II has the clamp surface 2a on an upper part thereof and the clamp surface 3a on a lower part thereof, and is contacted with the upper jaw 101 and the lower jaw 102 of the holder 100. Owing to these clamp surfaces 2a and 3a, the position of the insert 1 can be stabilized to further enhance positioning accuracy, thereby enhancing the constraint force.

Some examples of the material of the insert 1 are cemented carbide and cermet. Some examples of the composition of the cemented carbide are WC—Co produced by adding powder of cobalt (Co) to tungsten carbide (WC), followed by sintering, WC—TiC—Co obtained by adding titanium carbide (TiC) to WC—Co, and WC—TiC—TaC—Co obtained by adding tantalum carbide (TaC) to WC—TiC—Co. The cermet is a sintered composite material obtained by complexing metal with ceramic ingredients, and specific examples thereof are titanium compounds composed mainly of titanium carbide (TiC) or titanium nitride (TiN).

The surface of the insert 1 may be coated with a coating film by using chemical vapor deposition (CVD) method or physical vapor deposition (PVD) method. Some examples of the coating film composition are titanium carbide (TiC), titanium nitride (TiN), titanium carbon nitride (TiCN) and alumina (Al2O3).

For example, the insert 1 can be fixed to the holder 100 in the following manner. As shown in FIGS. 1 and 2, firstly, the insert 1 is inserted between the upper jaw 101 and the lower jaw 102, and the side surface 4 on the rear end side of the insert 1 is pressed against the contact surface 108.

Subsequently, the clamp screw 105 is fastened, and the upper jaw 101 is elastically deformed to be pressed down. Consequently, the insert 1 is pressed against the lower jaw 102 and is held fixed between the upper jaw 101 and the lower jaw 102. Additionally, when provided with the slit 107, the slit 107 makes it easier for the upper jaw 101 to be elastically deformed, thus making it easier to press down the front end of the upper jaw 101.

The insert 1 of the present embodiment includes the pair of cutting sections I and I as described above. This allows the insert 1 to have a plurality of cutting edges 5. Even when the cutting edge 5 is worn due to a long term use thereof, another unworn cutting edge 5 is usable, and it is economical because there is no need to separately prepare a fresh insert 1. For example, when one of the cutting edges 5 is worn in the cutting tool 20 of the present embodiment, the insert 1 is removed from the cutting tool 20, and the cutting section I of the insert 1 is replaced with the other cutting section I, and the insert 1 is reattached to the cutting tool 20. Thus, the unworn cutting edge 5 is usable for the cutting process by allowing it to be located outward of the holder 100.

Second Embodiment

An insert according to a second embodiment of the present invention is described in details below with reference to FIGS. 7 to 12. In FIGS. 7 to 12, elements similar to those in FIGS. 1 to 6 are identified by the same reference numerals, and descriptions thereof are omitted here.

As shown in FIGS. 7 to 9 and 12, a cutting tool 20' of the present embodiment includes an upper contact part 21'a comprised of an upper surface 2' of an insert 1' and a surface of a holder 100' opposed to an upper jaw 101', and a lower contact part 21'b comprised of a lower surface 3' of the insert 1' and a surface of the holder 100' opposed to a lower jaw 102'.

Figure 10A:
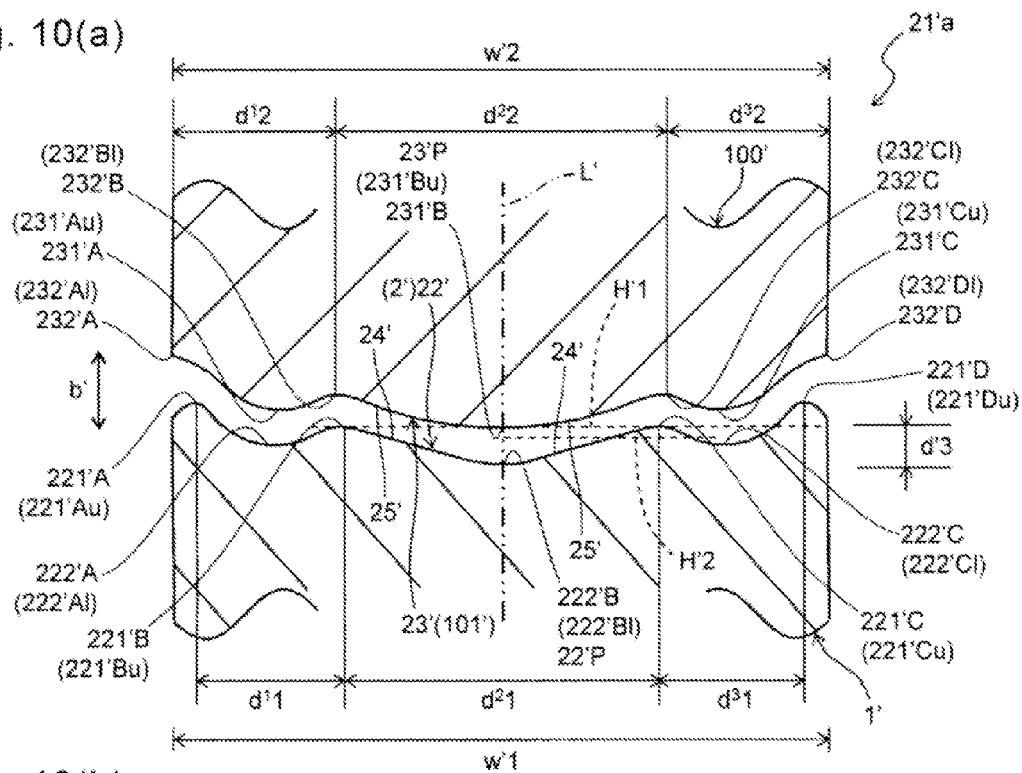
FIG. 10(a) is a partially enlarged sectional view of region B2 shown in FIG. 9(b), specifically, a drawing showing a non-pressed state.

As shown in FIG. 10(a), the upper contact part 21'a includes a second concave-convex surface 23' on the upper jaw 101' of the holder 100' and a first concave-convex surface 22' on the upper surface 2' of the insert 1'. The first concave-convex surface 22' has four first convex parts 221' and three first concave parts 222'. The second concave-convex surface 23' has three second convex parts 231' and four second concave parts 232'. For the sake of convenience, concave parts and convex parts of the concave-convex surfaces are prescribed as follows. That is, as shown in FIG. 10(a), on the first concave-convex surface 22', the first convex parts 221' are denoted by 221'A, 221'B, 221'C and 221'D, and the first concave parts 222' are denoted by 222'A, 222'B and 222'C in the left-to-right order of this figure. On the second concave-convex surface 23', the second convex parts 231' are denoted by 231'A, 231'B and 231'C, and the second concave parts 232' are denoted by 232'A, 232'B, 232'C and 232'D in the left-to-right order of this figure. The first convex parts 221' and the second concave parts 232', and the first concave parts 222' and the second convex parts 231' are respectively correspondingly located. Specifically, as shown in FIG. 10(a), the parts 221'A and 232'A, the parts 221'B and 232'B, the parts 221'C and 232'C, the parts 221'D and 232'D, the parts 222'A and 231'A, the parts 222'B and 231'B, and the parts 222'C and 231'C are respectively correspondingly located.

Figure 11A:
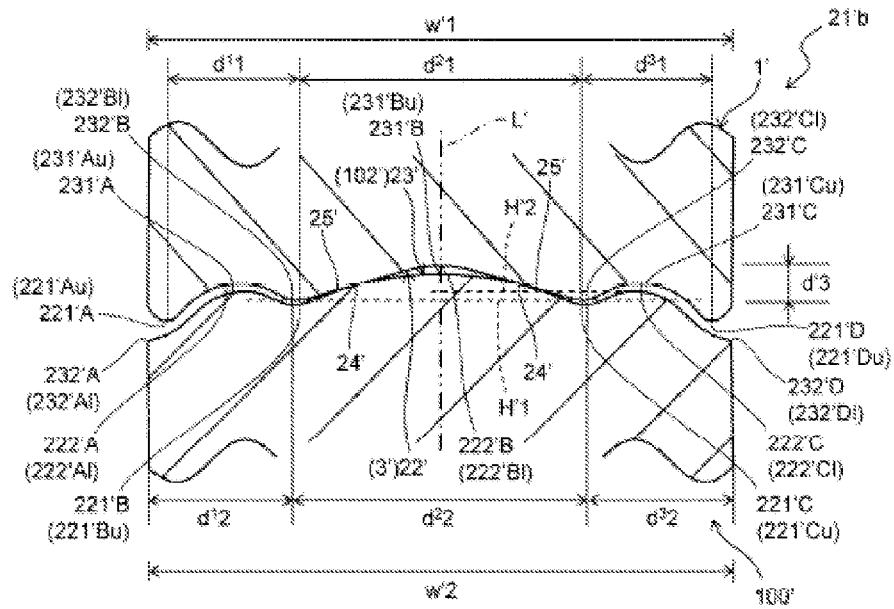
FIG. 11(a) is a partially enlarged sectional view of region C2 shown in FIG. 9(b), specifically, a drawing showing a non-pressed state.

The lower contact part 21'b has a second concave-convex surface 23' on the lower jaw 102' and a first concave-convex surface 22' on the lower surface 3' as shown in FIG. 11(a). The first concave-convex surface 22' has four first convex parts 221' and three first concave parts 222'. The second concave-convex surface 23' has three second convex parts 231' and four second concave parts 232'. For the sake of convenience, the concave parts and the convex parts in the concave-convex surfaces are prescribed as follows. As shown in FIG. 11(a), on the first concave-convex surface 22', the first convex parts 221' are denoted by 221'A, 221'B, 221'C and 221'D, and the first concave parts 222' are denoted by 222'A, 222'B and 222'C in the left-to-right order of this figure. On the second concave-convex surface 23', the second convex parts 231' are denoted by 231'A, 231'B and 231'C, and the second concave parts 232' are denoted by 232'A, 232'B, 232'C and 232'D in the left-to-right order of this figure. The first convex parts 221 and the second concave parts 232, and the first concave parts 222 and the second convex parts 231 are respectively correspondingly located. Specifically, as shown in FIG. 11(a), the parts 221'A and 232'A, the parts 221'B and 232'B, the parts 221'C and 232'C, the parts 221'D and 232'D, the parts 222'A and 231'A, the parts 222'B and 231'B, and the parts 222'C and 231'C are respectively correspondingly located.

In the present embodiment, the upper contact part 21'a and the lower contact part 21'b have the same shape, and therefore, the first concave-convex surface 22' and the second concave-convex surface 23' are described below by representatively illustrating the upper contact part 21'a.

Figure 10B:
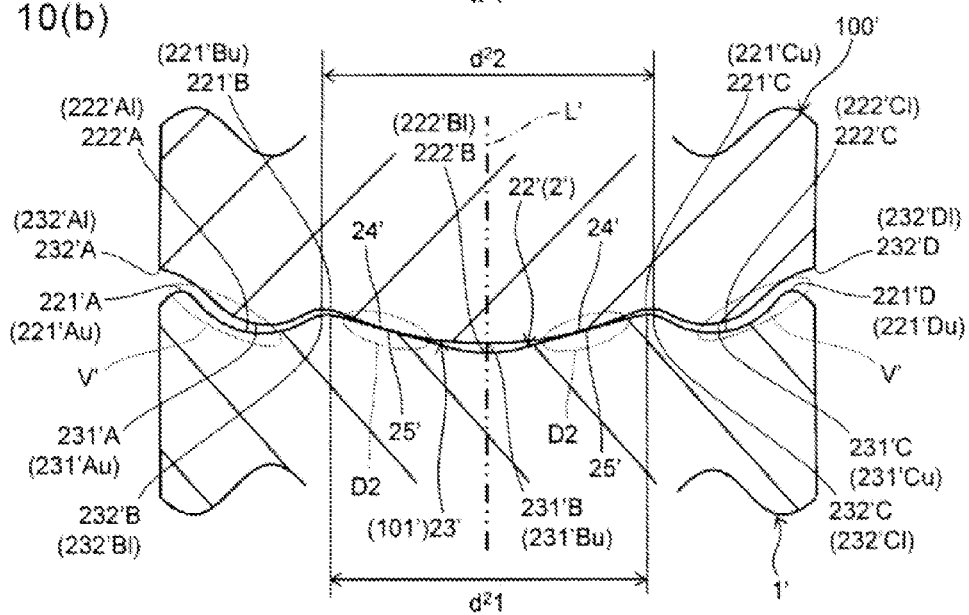
FIG. 10(b) is a drawing showing a pressed state.

The insert 1' and the holder 100' can be constrained by bringing the first convex parts 221' and the second concave parts 231', or the first concave parts 222' and the second convex parts 231' into contact with each other. At least one set of the first convex parts 221' and the second concave parts 232', and the first concave parts 222' and the second convex parts 231' needs to be contacted with each other. In the present embodiment, the insert 1' and the holder 100' are constrained by bringing the first concave part 222'B and the second convex part 231'B into contact with each other, as shown in FIG. 10(b).

In the upper contact part 21'a, a distance between tops of the first convex parts 221' adjacent to each other on the first concave-convex surface 22' is smaller than a distance between bottoms of the second concave parts 232' adjacent to each other on the second concave-convex surface 23' located correspondingly to these adjacent first convex parts 221'. As shown in FIG. 10(a), the present embodiment is configured to establish a relationship of d11<d12, where d11 is a distance between tops 221'Au and 221'Bu in the first convex parts 221'A and 221'B adjacent to each other on the first concave-convex surface 22', and d12 is a distance between bottoms 232'AI and 232'BI in the second concave parts 232'A and 232'B adjacent to each other on the second concave-convex surface 23'. The present embodiment is further configured to establish a relationship of d21<d22, where d21 is a distance between tops 221'Bu and 221'Cu in the first convex parts 221'B and 221'C adjacent to each other on the first concave-convex surface 22', and d22 is a distance between bottoms 232'BI and 232'CI in the second concave parts 232'B and 232'C adjacent to each other on the second concave-convex surface 23'. The present embodiment is still further configured to establish a relationship of d31<d32, where d31 is a distance between tops 221'Cu and 221'Du in the first convex parts 221'C and 221'D adjacent to each other on the first concave-convex surface 22', and d32 is a distance between bottoms 232'CI and 232'DI in the second concave parts 232'C and 232'D adjacent to each other on the second concave-convex surface 23'. These configurations leave gaps between the first concave-convex surface 22' and the second concave-convex surface 23'. That is, as shown in FIG. 10(b), in a state that the upper jaw 101' and the upper surface 2' are pressed together, a distance between the first convex parts 221' is smaller than a distance between the second concave parts 232', thus leaving a pair of gaps V' between the first convex part 221' and the second concave part 232'. Therefore, the contact part 21'a is susceptible to elastic deformation, and the insert 1' can be guided to an appropriate attached state, thereby attaching the insert 1 at a precise position. Additionally, during cutting, the concave parts and the convex parts can receive the force exerted in the sideways direction of the insert 1', thereby reducing the displacement of the insert 1' in the sideways direction. For example, d21 is preferably set at 1.14 to 2.32 mm, and d22 is preferably set at 1.22 to 2.40 mm. A difference between d21 and d22 is preferably set at 0.06 to 0.08 mm.

Figure 11B:
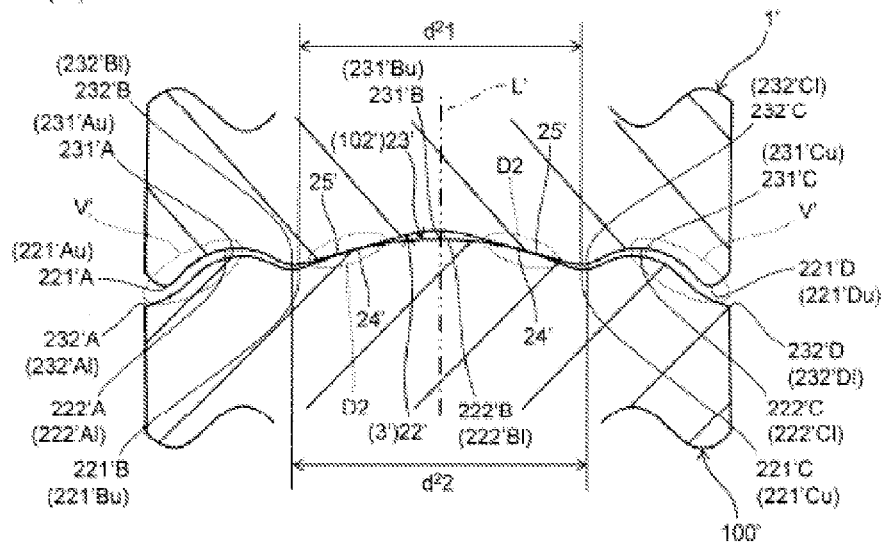
FIG. 11(b) is a drawing showing a pressed state.
Figure 12:
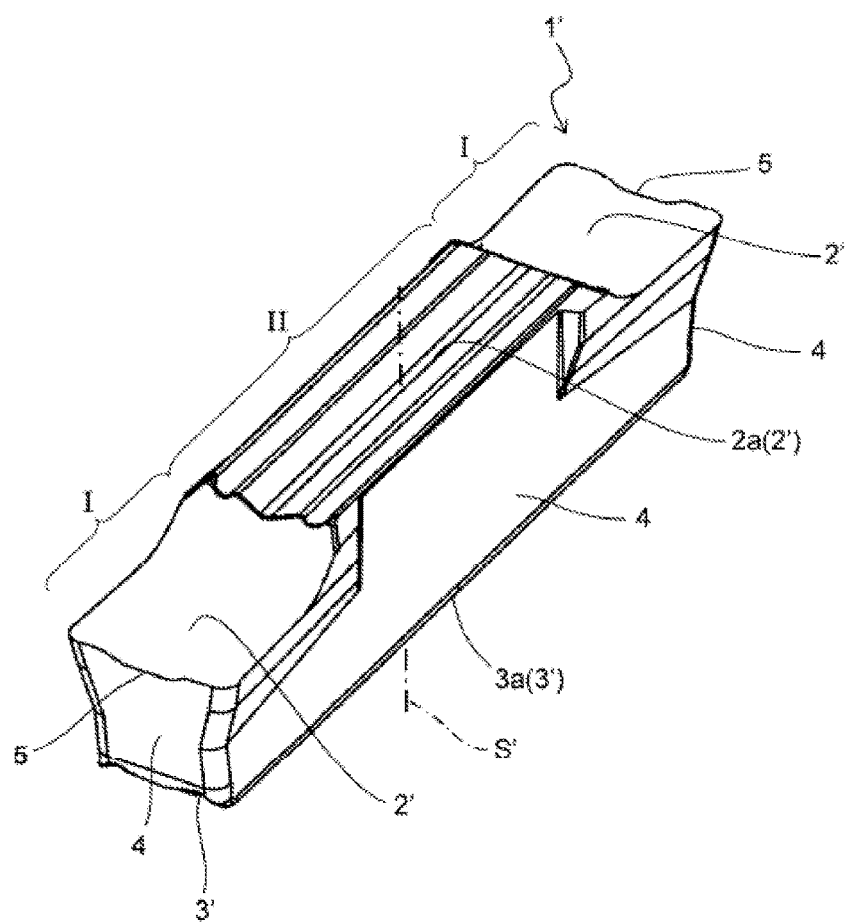
FIG. 12 is an enlarged perspective view of a cutting insert attached to the cutting tool shown in FIG. 7.

As shown in FIG. 10(a), the distance d21 is a half or more of a width w'1 of the first concave-convex surface 22', and the distance d22 is a half or more of a width w'2 of the second concave-convex surface 23. That is, d21≥(½)×w'1, and d22≥(½)×w'2. This configuration allows for a large contact area between the first concave part 222'B and the second convex part 231'B, thereby improving constraint force. For example, w'1 is preferably set at 1.8 to 5.0 mm, and w'2 is preferably set at 2.1 to 5.0 mm. More preferably, w'1 in the upper contact part 21'a as shown in FIG. 10 and w'1 in the lower contact part 21'b as shown in FIG. 11 may have the same value or different values. For example, when used for the face grooving process, w'1 in the lower contact part 21'b may be set to be smaller than w'1 in the upper contact part 21'a in consideration of a machining diameter.

In the present embodiment, as shown in FIG. 10, in a sectional view of the upper contact part 21'a, namely, a sectional view in a direction indicated by arrow b' perpendicular to the longitudinal direction of the holder 100' and parallel to a central axis S' of the insert 1', on the basis of a reference line L' passing through the bottom of a first concave part 222' of the first concave-convex surface 22' and the top of a second convex part 231' of the second concave-convex surface 23' located correspondingly to the first concave part 222', which are respectively located above and below in a direction parallel to the central axis S', the first convex part 221' located adjacent to the single first concave part 222' is located closer to the reference line L' than the second concave part 232' located adjacent to the second convex part 231'. Specifically, a bottom 222'BI of the first concave part 222'B on the first concave-convex surface 22' and a top 231'Bu of the second convex part 231'B on the second concave-convex surface 23' located correspondingly to the first concave part 222'B are located on the reference line L'. The first convex parts 221'B and 221'C located adjacent to the first concave part 222'B are respectively closer to the reference line L' than the second concave parts 232'B and 232'C located adjacent to the second convex part 231'B. According to this configuration, the bottom 222'BI of the first concave part 222'B and the top 231'Bu of the second convex part 231'B are located on the reference line L', and hence the distance between the bottom 222'BI of the first concave part 222'B and the top 231'Bu of the second convex part 231'B can be reduced as much as possible by the elastic deformation, in a state that the first concave part 222'B and the second convex part 231'B are easier to engage. Consequently, the constraint force between the first concave part 222'B and the second convex part 231'B can be further enhanced. Additionally, the contact position between the first concave part 222'B and the second convex part 231'B can be located closer to the bottom 222'BI of the first concave part 222'B, and the reaction force due to the elastic deformation can be further increased, thereby further enhancing the constraint force between the first concave part 222'B and the second convex part 231'B.

In the present embodiment, as shown in FIG. 10, the first concave part 222'B and the second convex part 231'B are respectively located at the middle part of the first concave-convex surface 22' and the second concave-convex surface 23' in the foregoing sectional view. Specifically, the reference line L' coincides with perpendicular bisectors of the first concave-convex surface 22' and the second concave-convex surface 23'. The reference line L' also passes through a middle point 22'P of the first concave-convex surface 22' and a middle point 23'P of the second concave-convex surface 23' in the foregoing sectional view. According to this configuration, the portion having the strongest constraint force is located at the middle parts of the first concave-convex surface 22' and the second concave-convex surface 23', thereby constraining the insert 1' while maintaining balance in the sideways direction of the insert 1'.

In the present embodiment, as shown in FIG. 10, in the foregoing sectional view, the first concave part 222'B has a pair of first inclined surfaces 24' and 24' whose mutual distance decreases as going toward the bottom 222'BI, and the second convex part 231'B located correspondingly to the first concave part 222'B has a pair of second inclined surfaces 25' and 25' which correspond to the pair of first inclined surfaces 24' and 24' and protrude toward the first inclined surfaces 24'.

In the present embodiment, as shown in FIG. 10(b), the first inclined surfaces 24' of the first concave part 222'B and the second inclined surfaces 25' of the second convex part 231'B are contacted with each other. In the present embodiment, as shown in FIG. 10(b), the first concave part 222'B has the first inclined surfaces 24' and the second convex part 231'B has the second inclined surfaces 25' protruding toward the first inclined surfaces 24' in regions D2. According to this configuration, the first inclined surfaces 24' can easily be moved along the second inclined surfaces 25', and the contact position between the second convex part 231'B and the first concave part 222'B can be further closer to the bottom 222'BI of the first concave part 222'B. The second inclined surface 25' preferably has a larger radius of curvature. The radius of curvature of the second inclined surfaces 25' is preferably set at, for example, 7.5 to 10 mm.

In the present embodiment, as shown in FIG. 10, from the viewpoint of easy manufacturing, the second convex part 231' B is formed by a curved line obtained by a radius of curvature in the foregoing sectional view. As shown in FIG. 10(a), a contact position between the second convex part 231'B and the first concave part 222'B is preferably located in the following range from the viewpoint of improving constraint force. That is, the contact position is preferably located closer to the bottom 222'BI of the first concave part 222'B than a straight line H'2, where H'1 is a straight line perpendicular to the central axis S' of the insert 1' and passing through the top 221'Bu of the first convex part 221'B, d'3 is a distance between the bottom 222'BI of the first concave part 222'B and the top 221'Bu of the first convex part 221'B, and H'2 is a straight line obtained by allowing the straight line H'1 to be parallel-shifted to the bottom 222'BI of the first concave part 222'B by a quarter of the distance d'3. For example, the distance d'3 is preferably set at 0.12 to 0.28 mm.

In the present embodiment, as shown in FIG. 10, both of the first concave-convex surface 22' and the second concave-convex surface 23' have a line symmetric shape with respect to the reference line L'. According to this configuration, the contact area and constraint force are uniform around the reference line L' in the sideways direction of the first concave-convex surface 22' and the second concave-convex surface 23'. Therefore, the insert 1' can be constrained while maintaining balance in the sideways direction of the insert 1'.

In the present embodiment, as shown in FIG. 10(a), when the first concave-convex surface 22' is positioned on the lower side and the second concave-convex surface 23 is positioned on the upper side in the foregoing sectional view, tops 221'Au and 221'Du of the first convex parts 221'A and 221'D located farthest from the reference line L' are located at a higher position than the top of other first convex part 221'. According to this configuration, the force exerted in the sideways direction of the insert 1' during cutting can be received by the first convex parts 221'A and 221'D respectively located closest to the ends of the cutting tool 20' in the sideways direction thereof, thereby more effectively reducing the displacement in the sideways direction of the insert 1'. Other configurations are similar to those of the cutting tool 20 of the foregoing first embodiment, and therefore descriptions thereof are omitted here.

<Method of Manufacturing Machined Product>

Next, a method of manufacturing a machined product according to an embodiment of the present invention is described below with reference to FIG. 13. In the present embodiment, the description is made by taking the cutting tool 20 as an example.

The present embodiment is the face grooving process. Therefore, as shown in FIG. 13(d), an annular groove 31 is formed on an end surface of a workpiece 30. A part of the workpiece 30 shown in FIGS. 13(a) to 13(c) is illustrated in a sectional view.

Figure 13A:
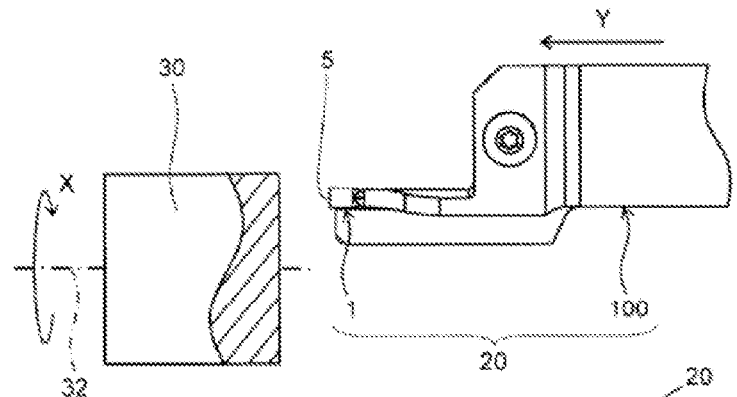
FIGS. 13(a) to 13(c) are schematic diagrams showing a method of manufacturing a machined product according to an embodiment of the present invention.
Figure 13B:
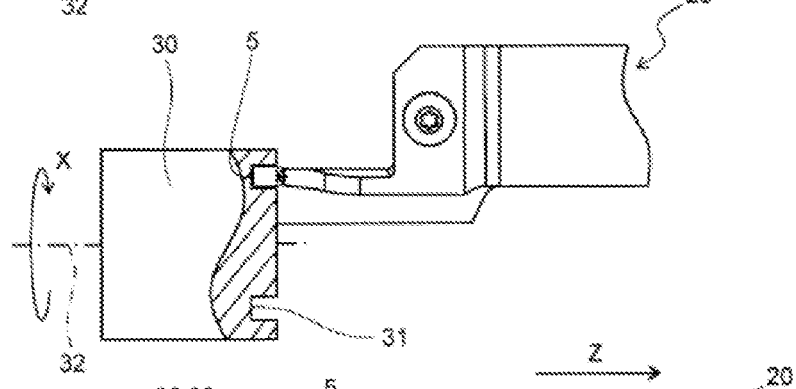
Figure 13C:
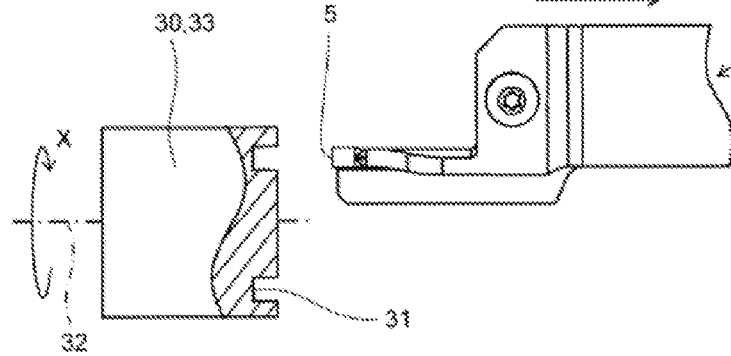
Figure 13D:
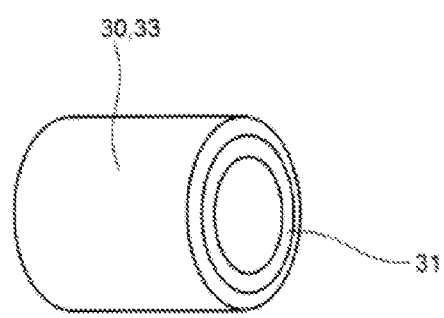
FIG. 13(d) is a perspective view of the machined product.

The method of manufacturing the machined product according to the present embodiment includes the following steps (i) to (iv):

(i) rotating the substantially cylinder-like workpiece 30 around a rotation axis 32 in a direction of arrow X, as shown in FIG. 13(a);

(ii) bringing the cutting tool 20 near the workpiece 30 being rotated by moving the cutting tool 20 in a direction of arrow Y;

(iii) cutting the workpiece 30 by bringing the cutting edge 5 of the cutting tool 20 into contact against the workpiece 30 being rotated, as shown in FIG. 13(b); and (iv) separating the cutting tool 20 from the workpiece 30 after being cut by moving the cutting tool 20 in a direction of arrow Z, as shown in FIG. 13(c).

A machined product 33 as shown in FIG. 13(d) is manufactured through the foregoing manufacturing steps.

In the step (i), the workpiece 30 and the cutting tool 20 may be brought near each other. For example, the workpiece 30 may be brought near the cutting tool 20. Similarly, in the step (iv), the workpiece 30 and the cutting tool 20 may be separated from each other. For example, the workpiece 30 may be separated from the cutting tool 20. In the step (iii), during the grooving process, a longitudinal machining for forming a groove and a traversing process for flattening the bottom surface of the groove are carried out.

When the cutting process is continued, it is required to repeat the step of bringing the cutting edge 5 of the cutting tool 20 into contact against different locations of the workpiece 30, while keeping the workpiece 30 rotating.

Examples of the material of the workpiece 30 are carbon steel, alloy steel, stainless steel, cast iron and non-iron metal.

Although the present embodiment has been described using the left hand type holder 100, a right hand type holder 100 may be used. Although the present embodiment has been described illustrating the case of using the cutting tool 20, a similar effect can be produced by using the cutting tool 20' instead of the cutting tool 20.

While the several embodiments of the present invention and the modifications thereof have been illustrated and described, it is to be understood that the present invention is not limited to the foregoing embodiments, and various changes and modifications can be made therein without departing from the spirit or scope of the present invention.

For example, in the cutting tool 20 according to the foregoing embodiment, as shown in FIG. 4, both the first concave-convex surface 22 and the second concave-convex surface 23 have the line symmetric shape with respect to the reference line L. Alternatively, the first concave-convex surface and the second concave-convex surface may have a shape shifted to one side with respect to the reference line L. This configuration can more effectively reduce the displacement in the sideways direction of the insert in the left or right hand type holder.

What is claimed is:

1. A cutting tool, comprising:
a cutting insert comprising an upper surface, a lower surface and a cutting edge located on at least part of sides of the upper surface; and
a holder comprising an upper jaw and a lower jaw that respectively fix the cutting insert from the upper surface and the lower surface at a front end part in a longitudinal direction thereof,
wherein at least one of an upper contact part of the upper surface of the cutting insert and the upper jaw of the holder and a lower contact part of the lower surface of the cutting insert and the lower jaw of the holder comprises a first concave-convex surface and a second concave-convex surface, the first concave-convex surface comprising a plurality of first convex parts and at least one first concave part that extend along the longitudinal direction of the holder, the second concave-convex surface comprising a plurality of second concave parts located correspondingly to the plurality of first convex parts and at least one second convex part located correspondingly to the at least one first concave part, wherein a distance d1 between tops of the first convex parts adjacent to each other among the plurality of first convex parts of the first concave-convex surface is smaller than a distance d2 between bottoms of the second concave parts adjacent to each other among the plurality of second concave parts of the second concave-convex surface which are located correspondingly to the first convex parts adjacent to each other in a sectional view perpendicular to the longitudinal direction of the holder, and further comprising a gap between the first concave-convex surface and the second concave-convex surface.

2. A cutting tool, comprising:

a cutting insert comprising an upper surface, a lower surface and a cutting edge located on at least part of sides of the upper surface; and a holder comprising an upper jaw and a lower jaw that respectively fix the cutting insert from the upper surface and the lower surface at a front end part in a longitudinal direction thereof, wherein at least one of an upper contact part of the upper surface of the cutting insert and the upper jaw of the holder and a lower contact part of the lower surface of the cutting insert and the lower jaw of the holder comprises a first concave-convex surface and a second concave-convex surface, the first concave-convex surface comprising a plurality of first convex parts and at least one first concave part that extend along the longitudinal direction of the holder, the second concave-convex surface comprising a plurality of second concave parts located correspondingly to the plurality of first convex parts and at least one second convex part located correspondingly to the at least one first concave part, wherein a distance d1 between tops of the first convex parts adjacent to each other among the plurality of first convex parts of the first concave-convex surface is smaller than a distance d2 between bottoms of the second concave parts adjacent to each other among the plurality of second concave parts of the second concave-convex surface which are located correspondingly to the first convex parts adjacent to each other in a sectional view perpendicular to the longitudinal direction of the holder, and wherein the distance d1 is a half or more of a width w1 of the first concave-convex surface, and the distance d2 is a half or more of a width w2 of the second concave-convex surface in the sectional view.

3. A cutting tool, comprising:

a cutting insert comprising an upper surface, a lower surface and a cutting edge located on at least part of sides of the upper surface; and a holder comprising an upper jaw and a lower jaw that respectively fix the cutting insert from the upper surface and the lower surface at a front end part in a longitudinal direction thereof, wherein at least one of an upper contact part of the upper surface of the cutting insert and the upper jaw of the holder and a lower contact part of the lower surface of the cutting insert and the lower jaw of the holder comprises a first concave-convex surface and a second concave-convex surface, the first concave-convex surface comprising a plurality of first convex parts and at least one first concave part that extend along the longitudinal direction of the holder, the second concave-convex surface comprising a plurality of second concave parts located correspondingly to the plurality of first convex parts and at least one second convex part located correspondingly to the at least one first concave part, wherein a distance d1 between tops of the first convex parts adjacent to each other among the plurality of first convex parts of the first concave-convex surface is smaller than a distance d2 between bottoms of the second concave parts adjacent to each other among the plurality of second concave parts of the second concave-convex surface which are located correspondingly to the first convex parts adjacent to each other in a sectional view perpendicular to the longitudinal direction of the holder, and wherein, on a basis of a reference line L passing through a bottom of one first concave part of the at least one first concave part located between the first convex parts adjacent to each other and passing through a top of one second convex part of the at least one second convex part located correspondingly to the one first concave part, the first convex part located adjacent to the one first concave part is located closer to the reference line L than the second concave part located adjacent to the one second convex part in the sectional view.

4. The cutting tool according to claim 3, wherein the lower contact part comprises the first concave-convex surface and the second concave-convex surface.

5. The cutting tool according to claim 3, wherein the one first concave part and the one second convex part are respectively located at a middle part of the first concave-convex surface and the second concave-convex surface in the sectional view.

6. The cutting tool according to claim 3, wherein the reference line L passes through a middle point on the first concave-convex surface and a middle point on the second concave-convex surface in the sectional view.

7. The cutting tool according to claim 3, wherein the one first concave part comprises a pair of first inclined surfaces, whose mutual distance decreases as going toward the bottom, and the one second convex part comprises a pair of second inclined surfaces protruding toward the pair of first inclined surfaces and contacting with the pair of first inclined surfaces in the sectional view.

8. The cutting tool according to claim 7, wherein an angle formed by virtual extension lines of the pair of first inclined surfaces is an obtuse angle in the sectional view.

9. The cutting tool according to claim 3, wherein the top of the one second convex part has a straight line shape in the sectional view.

10. The cutting tool according to claim 9, wherein the bottom of the one first concave part has a straight line shape and a width smaller than a width of the top of the one second convex part in the sectional view.

11. The cutting tool according to claim 3, wherein the one first concave part and the one second convex part are line symmetric with respect to the reference line L.

12. The cutting tool according to claim 3, wherein
the at least one second convex part comprises a plurality of second convex parts, and
a top of the second convex part located farthest from the reference line L among the plurality of second convex parts is located at a higher position than a top of another second convex part when the first concave-convex surface is positioned on an upper side and the second concave-convex surface is positioned on a lower side in the sectional view.

* * * * *